US006772288B1

United States Patent
Flake et al.

(10) Patent No.: US 6,772,288 B1
(45) Date of Patent: Aug. 3, 2004

(54) EXTENDED CACHE MEMORY SYSTEM AND METHOD FOR CACHING DATA INCLUDING CHANGING A STATE FIELD VALUE IN AN EXTENT RECORD

(75) Inventors: Lance L. Flake, Boulder, CO (US); Timothy R. Feldman, Louisville, CO (US)

(73) Assignee: STMicroelectronics, Inc., Carrollton, TX (US)

( * ) Notice: Subject to any disclaimer, the term of this patent is extended or adjusted under 35 U.S.C. 154(b) by 191 days.

(21) Appl. No.: 09/655,952

(22) Filed: Sep. 6, 2000

(51) Int. Cl.[7] .............................................. G06F 13/00
(52) U.S. Cl. ........................................................ 711/118
(58) Field of Search ............................... 711/118, 113, 711/112, 170, 171

(56) References Cited

U.S. PATENT DOCUMENTS

| | | | |
|---|---|---|---|
| 4,593,354 A | * 6/1986 | Ushiro | 714/48 |
| 5,261,066 A | 11/1993 | Jouppi et al. | 711/122 |
| 5,860,131 A | 1/1999 | Daub | 711/170 |
| 5,920,887 A | 7/1999 | Sokolov | 711/113 |
| 5,970,508 A | 10/1999 | Howe et al. | 711/113 |
| 6,047,357 A | 4/2000 | Bannon et al. | 711/133 |
| 6,078,992 A | 6/2000 | Hum | 711/122 |
| 6,427,195 B1 | * 7/2002 | McGowen et al. | 711/153 |

OTHER PUBLICATIONS

Hersch, "Parallel Storage and Retrieval of Pixmap Images," Twelfth IEEE Symposium on Mass Storage Systems, 1993, Putting All That Data to Work, Apr. 1993, pp. 221–226.*
"An Analysis of Division Algorithms and Implementations," by Stuart F. Oberman & Michael J. Flynn, Technical Report: CSL-TR-95-675 Jul. 1995.

* cited by examiner

Primary Examiner—Glenn Gossage
(74) Attorney, Agent, or Firm—Lisa K. Jorgenson; William J. Kubida

(57) ABSTRACT

A cache system and a method for an extent-based cache memory design are disclosed. The method Includes providing a storage device and a host device where each device is in communication with the memory and creating an extent record associated with the memory. A storage device access request is received from the host device and at least one state field value in the extent record is changed in response to the access request from the host device. The size of an extent associated with the extent record and allocated within the memory may be based on the access request and any additional speculative data. The at least one state field value may be selected from the group consisting of extent size, valid count, hit count, and dirty count. The storage device may be implemented as an intelligent hard disk drive and the memory may be implemented by random access memory (RAM).

22 Claims, 2 Drawing Sheets

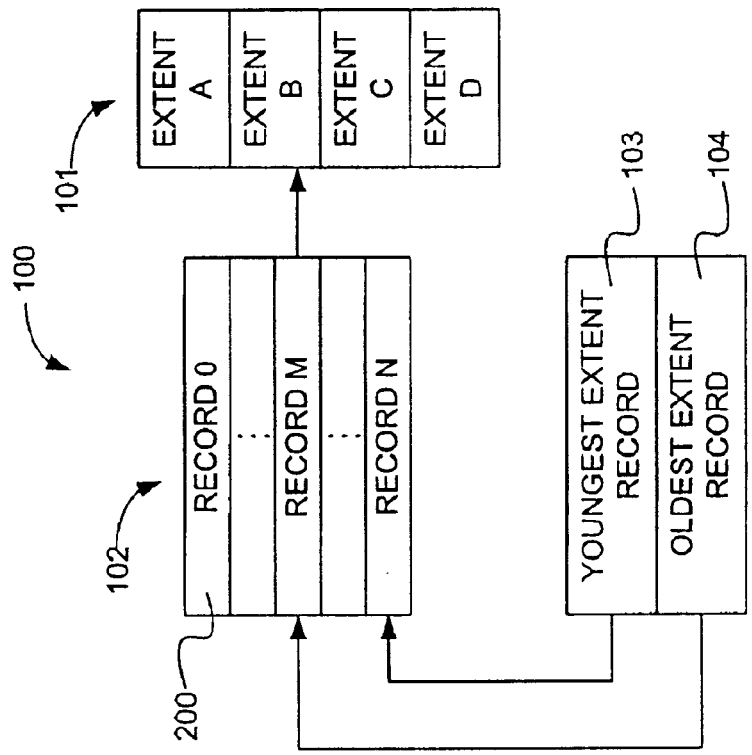

EXTENDED CACHE MEMORY SYSTEM AND METHOD FOR CACHING DATA INCLUDING CHANGING A STATE FIELD VALUE IN AN EXTENT RECORD

BACKGROUND OF THE INVENTION

1. Field of the Invention

The present invention relates, in general, to cache memory and methods for using cache memory, and, more particularly, to a method and system that uses an extent-based cache memory management.

2. Relevant Background

Data processing systems rely on a variety of data storage mechanisms for storing data and program code. Each storage mechanism has an associated latency because of delay incurred in writing data to and reading data from the storage device. Storage mechanisms range from low latency mechanisms such as static random access memory (SRAM) located physically near data processing elements to magnetic, optical and remote storage mechanisms with latencies that are several orders of magnitude larger than SRAM. Mass storage devices tend to have greater latency than working memory located physically and logically close to a data processor.

There is a continuous need for techniques that can enhance performance without significantly increasing the cost and complication of a design. Caching is one technique implemented to improve performance of data storage systems. Cache technology hides latency associated with mass storage such as magnetic and optical disk storage devices. Cache technology involves providing a relatively low latency memory device between a relatively high latency memory storage device and a host device. The memory device, organized as cache, stores write and/or read data so that subsequent read/write commands might be satisfied with the data in the cache rather than the high latency storage device. Depending on the writeback policy in effect, as determined by hardware or software, write operations may or may not be cached. Moreover, cache management hardware/software may designate only portions of the high latency memory storage device to be cacheable while other portions are designated uncacheable. Transferring data to and from the relatively low latency buffer cache memory instead of the much slower, high latency storage device cuts down on transfer time and boosts the speed of the system.

The data transfer time savings of cache technology increases when an increasing percentage of read/write requests are satisfied with just the data stored in the cache memory. A successful transfer that exclusively uses data from cache memory to satisfy a request is called a "hit". Conversely, a "miss"—also called a "cache miss"—occurs when additional data from the relatively higher latency data storage device is required.

Design principles that guide the design of cache memory include reducing cache misses, and efficiently allocating cache memory for nonsequential commands. Reducing cache misses increases the ratio of hits to the total blocks of transferred data (known as the hit rate). The higher the hit rate, the more likely that an access request from a host device, such as a central processing unit (CPU), is filled by the low latency cache memory instead of high latency data storage device (e.g., a hard disk).

Cache misses are classified into various types including compulsory misses, capacity misses, conflict misses and coherence misses. Compulsory misses occur when data is brought into the cache memory for the first time. Increasing the size of the post-request speculative read reduces compulsory misses by taking advantage of spatial locality properties of stored data. Capacity misses result from the fact that the cache memory is always smaller than the higher latency store being cached. Increasing the total cache size reduces capacity misses. Conflict misses occur when two or more backing locations map to the same place in the cache, requiring that old cache data be replaced and then brought back later. Increasing the associativity of the cache lines reduces conflict misses. Coherence misses are misses that would not otherwise occur except for invalidation to preserve multiprocessor cache consistency.

Write-back caching reports a write command as completed to the host issuing the write request when the write command data enters the buffer cache memory. The actual completion of the write command (i.e., committing data to the high latency data storage device) may be delayed until conditions are optimized for transferring the data from the buffer cache memory to the higher latency data storage device. In contrast, "write-through" caching automatically executes the write command while simultaneously copying data to the buffer cache memory. Write-through caching is often less efficient than write-back caching, but are more reliable in some applications.

Yet another cache memory design principle considers the efficient processing of both sequential and non-sequential access patterns. In the context of disk drive caching, when two commands refer to a contiguous range of logical block addresses (LBAs), the disk drive designates one command to be sequential with the other command. For example, a first command designating an LBA that starts with logical block 512 and spans 512 contiguous logical blocks would be sequential with a second command designating an LBA that starts with block 1024 and also spans a contiguous number of logical blocks. If the second command were not sequential with the first, it may be designated a non-sequential command. An efficient cache memory management system recognizes both types of commands and processes them in an order that maximizes the data transfer rate.

Cache memory systems have traditionally taken one of two approaches: the first is called a tagged memory data structure and the second is called a segmented memory data structure. Tag-managed caches are typically found in systems that cache main memory of a processor. In contrast, segmented memory structures are often used in disk drive cache systems where cache performance has traditionally been less critical.

Tag cache memory systems employ a tag memory data structure to manage the contents of the cache. The cache comprises a plurality of cache lines. Each cache line is associated with a tag that points to the location of a logical block within the cache. In tag cache memory systems, part of the LBA is used to address the tag memory structure. Each tag line stores the rest of the LBA to indicate which blocks are stored in the cache. The size of the tag memory places a limit on how precisely logical blocks can be indexed in the cache memory.

Cache line tags are grouped into sets that are searched to locate a particular logical block or blocks. In direct mapped caches, the cache contains just a single cache set. Any particular LBA can map to only one particular cache line. If a logical block is not identified in one of the cache line tags, it will not be found in that set, and a cache miss occurs. Also, when two or more LBA's that are currently in use map to the same cache line the cache line will be continuously evicting and reloading the cache line in a condition sometimes referred to as "thrashing". This increases the rate of conflict misses.

At the other extreme, in a fully associative cache, each cache line is a set. Hence, each LBA can map to any available cache line. In this cache structure, searching the sets is guaranteed to produce a cache hit if the logical block is in the cache. In a fully associative cache, cache lines may be evicted based solely on objective criteria, such as least recently used algorithms, and thereby minimizing conflict misses. However, searching each set is more complicated and possibly more time consuming than searching a single set with a single cache line tag.

Between the extremes of direct mapped caches and fully associative caches are set-associative caches. In set-associative caches, a plurality of cache lines are included in each set. Any given LBA can map to a cache line within any set. Hence, conflict misses are not minimized, but they are held at an acceptable level. Set-associative caches have fewer address clashes than direct-mapped caches, and require less complex and possibly less time consuming search operations than fully-associative caches.

Segmented buffer memory systems allocate the available memory to a set of segments. Each segment holds a span of contiguous logical blocks of data equal to or smaller than the size of the segment. The size of the segments may be statically or dynamically allocated, depending on the complexity of the cache memory management structure. Typically, the number of segments is fixed to the maximum number supported by the available cache memory hardware. Some systems, however, use complex software controls to dynamically change the number of segments in the cache memory.

Segments are circular queues for data buffering between a host and a relatively higher latency data storage device. In addition to the inherent rate matching function of segments, they contain the most recent access sequence and therefore perform a caching function as well. Some operations performed by segmented cache memory systems include re-allocation of segments for read/write access, and performing coherent read hit detection across an active set of segments.

Unfortunately, traditional tagged and segmented memory structures are poorly suited for handling rapid, complex access request sequences from modern host devices. Traditional tagged cache memory structures rigidly define how data is mapped between cache and logical blocks in the high latency data devices. The restrictions on mapping create inefficiencies in the performance of the cache. Furthermore, segmented cache memory structures typically predetermine the size of the data set in the cache, regardless of the actual pattern of access requests from a host device. Consequently, the fixed sized segmented cache memory is rarely well matched to satisfy the dynamically changing access request pattern from the host device.

SUMMARY OF THE INVENTION

Briefly stated, the present invention includes a cache system and method for an extent-based cache memory design. A method of the present invention for caching data in a memory comprises the steps of: providing a storage device and a host device, where each device is in communication with the memory; creating an extent record associated with the memory; receiving a storage device access request from the host device; and changing at least one state field value in the extent record in response to the access request from the host device.

In a preferred aspect, the method of the present invention also comprises allocating an extent within the memory and associated with the extent record, where the size of the extent is allocated based on the access request plus any additional space for speculation and operations before and/ or after the requested span of LBA's.

In another preferred aspect, the changing of at least one state field value in the extent record in response to the access request comprises the steps of incrementing a hit count each time a target logical block is identified in the cache, and then decrementing the hit count after each target logical block is read from the memory to the host device, where the target logical blocks are not re-allocated in memory until the hit count is fully decremented. In this preferred aspect, target logical blocks are logical blocks identified in the cache as satisfying a read request from the host device.

In yet another preferred aspect, the changing of at least one state field value in the extent record in response to the access request comprises the steps of incrementing a dirty count after a logical block is written from the host device to the memory and then decrementing the dirty count after the logical block is written from the memory to the storage device, wherein the logical block is not re-allocated in the memory until the dirty count is fully decremented.

Another aspect of the present invention includes an extent record-managed cache memory that comprises a memory in communication with a storage device and a host device, an extent record associated with the memory, and at least one state field value in the extent record that changes in response to an access request from the host device.

Yet another aspect of the present invention includes a storage device that comprises a higher latency data storage component, a lower latency memory in communication with the higher latency data storage component and a storage device, an extent record associated with the lower latency memory, and at least one state field value in the extent record that changes its value in response to an access request by the host device.

Still another aspect of the present invention includes a data storage system that comprises a higher latency data storage component, a host device, a lower latency memory that is in communication with the higher latency data storage component and the host device, an extent record associated with the lower latency memory, and at least one state field value in the extent record that changes its value in response to an access request from the host device.

BRIEF DESCRIPTION OF THE DRAWINGS

FIG. 1 shows a logical diagram of the cache memory design of the present invention ;

FIG. 2 shows an individual extent record; and

DETAILED DESCRIPTION OF THE PREFERRED EMBODIMENTS

Figure 3:
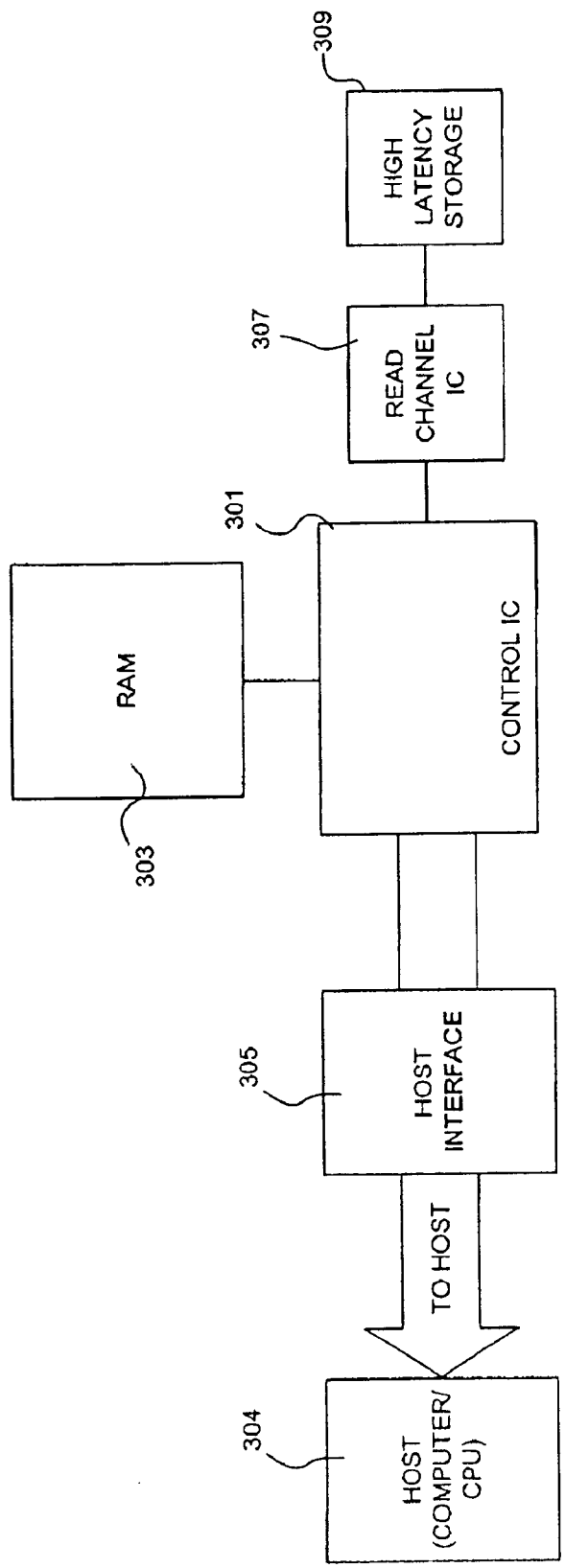
FIG. 3 shows an illustration of a preferred storage device of the present invention.

The present invention involves a cache management system and method that provides benefits of both tag-managed caches and segmented buffers. While the present invention is described in terms of a specific application to hard disk drive caching, the general principles are more widely applicable to any cache management system.

The logical structure of an embodiment of an extent-based cache memory 100 in accordance with the present invention is illustrated in FIG. 1. Cache memory 100 preferably exists in a buffer memory 101 and may occupy the whole buffer memory 101 or a fraction less than the entire buffer memory. Cache memory 100 preferably comprises one or more extents, labeled "EXTENT A" through "EXTENT D" in FIG. 1, and an extent record set 102. Extent record set 102 contains a plurality of extent records 200, labeled "0" through "N", in FIG. 1. An extent record within set 102 is associated with each extent. The number of extents and their size are dynamically determined by access requests from a host device. For example, the cache memory could contain one large extent or many different-sized extents at any given time. In the implementation shown in FIG. 1 extent record set 102 is sized to enable implementation of the maximum desired number of extent records, but at any given time will contain only one extent record for each currently defined extent. Hence, there may be null extent records (e.g., extent records with zero size) within extent record set 102.

The present invention does not impose associativity restrictions on how the logical blocks are mapped in the cache memory. In this preferred cache memory, logical blocks needed to satisfy access requests from a host device are found by examining the extent records 0 through N. The relevant logical blocks are then pin-pointed in the cache memory through a pointer field value in the extent record.

The extent records 200 preferably provide information that describes the logical block contents of the cache memory. As illustration in FIG. 2, an extent record 200 of the present invention comprises a number of state field values which preferably include logical block address (LBA), an extent size, a valid count, a hit count, a dirty count, and a pointer. The LBA value represents the starting LBA of the extent associated with the extent record 200. The extent size value represents the number of logical blocks contained in the associated extent. The valid count value represents the number of logical blocks in the associated extent that are identified as valid (i.e., containing potentially relevant data) by an access request. The hit count value acts as a counting semaphore for protecting the associated extent from being re-allocated in cache memory before requested data from that extent is completely transferred to the host device (e.g., before a read data request from the host device is completed). The dirty count value acts as a counting semaphore for protecting the associated extent from being re-allocated in the cache memory before requested data from that extent is completely transferred to the higher latency storage component (e.g., before a write data request from the host device is completed).

In a preferred aspect, each extent record 200 further includes "hit offset" and "dirty offset" fields. These fields define a beginning portion of an extent that is available for re-allocation while the remainder of the extent is satisfying an access request from a host device. The unprotected portion of a partially protected extent may be re-allocated to provide cache memory space for a new extent.

An extent of the present invention preferably comprises a contiguous range of logical blocks that are allocated in the cache memory. The number of logical blocks in a valid extent is preferably at least one block. An extent may also comprise more than one set of contiguous logical blocks where the sets are not contiguous. The size of the extent (i.e., the number of logical blocks in the extent) is dynamically determined based on access requests from a host device.

When an extent record describes an extent with at least one logical block, it is called a valid extent record. An extent record describing an extent with no logical blocks (i.e., a record having a zero size) is called an invalid extent record. In a preferred aspect, a single extent is not allowed to occupy more than one half the cache memory. In this preferred aspect, a single sequential access request pattern may progress regardless of the transfer rates of logical blocks from the cache to the host device or the higher latency storage device.

Each extent record is given an extent record number. The numbers are preferably in sequential numeric order. In a preferred initialization procedure of the present invention, two extents are created when the cache memory is initialized. The older of the two extents is assigned extent record number zero while the younger extent gets extent record number one.

In the preferred structure for the extent record numbers, the number of valid (also called "active") extents can be determined at any time by subtracting the youngest extent record number from the oldest extent record number, modulo the total number of extent records possible. The preferred structure also takes advantage of the locality of reference typically exhibited in future access requests by indexing extent records based on the spatial and temporal locality contained in the sequence of previous access requests.

In a preferred procedure, the extent record set is initialized with the first two extent record sizes equal to one half the cache memory size and all other extent records are set to zero size. This initialization state describes a cache memory that has two initial extents. The first two initial extent records associated with these initial extents are preferably also equal to one half the cache memory size, with their hit counts and dirty counts set to zero. The LBA values of the records are also preferably set to values outside the operational range of the cache memory in order to prevent an access request from hitting on the initialized state of the cache memory, and retrieving un-initialized cache memory data. This is preferably accomplished by using the largest possible binary number that will fit in the LBA field, minus the size of the cache memory. Such an LBA value, while logically correct, will not allow read hits to occur on an initial extent.

If there are no possible LBA values outside the operational range of the cache memory, a preferred alternate initialization procedure uses a "valid flag" field in the extent records. The valid flag field value indicates whether the extent is available to access requests. In this preferred procedure, extent records created by the initialization of the cache memory have valid flag field values cleared to indicate that they are not available to access requests. This prevents access hits on these extents, thereby ensuring that they can be re-allocated to make room in the cache memory for new extents. In an additional preferred step, a "free space count" field is also in the extent record. The free space count field value is first set to the total number of logical blocks that could fit in the newly initialized cache memory. The free space count field value is decremented for each logical block that is re-allocated with the creation of new extents in the cache memory. Eventually, the count value decrements to zero, signaling that the cache memory can now be managed according to the method of the present invention.

The extent record set in the cache memory of the present invention preferably represents the most current set of cached data that is dynamically created by access requests from the host device. The extent record set is preferably implemented as a linear array of identical records. This linear array is used as a circular list, with modulo addressing to progress through the list. Extents are kept in temporal creation order to support the list. As a new extent is created, the cache memory takes space from existing extents, starting with the oldest extent. This process supports a First-In-First-Out (FIFO) replacement technique that supports the simple list structure. Alternate preferred replacement techniques include the Least-Recently-Used (LRU) technique that uses additional state fields in the extent records to support list reordering.

When extent records are identified as relevant during an access request, the hit count or dirty count value of the record is preferably incremented. The hit count or dirty count remains at its incremented value while data is being read to a host device, or written to a higher latency storage device. Once the cache memory has completed work on the access request, the hit count or dirty count is decremented back to its old value. In a preferred aspect, when the hit count or dirty count has an incremented value (e.g., a nonzero value), then none of the logical blocks in the associated extent can be re-allocated.

In still another preferred aspect, the youngest extent, and its associated extent record, is created during a cache reservation operation. The newly created, youngest extent preferably replaces a portion of the cache memory comprising at least a portion of the oldest (least recently created) extent. Preferably, the cache control logic used in the cache reservation operation allocates space for the youngest extent that is larger than the size of oldest extent. By replacing the oldest extent with a larger youngest extent, fewer extents and extent records may be needed to index the whole cache memory. However, the cache memory allocated to the youngest extent record is preferably limited to less than half the size of the whole cache memory.

The youngest extent may also preferably replace less than the whole of the oldest extent. In this preferred aspect, a fraction of the logical blocks starting from the first logical block is re-allocated to provide space for the youngest extent. The extent record associated with the oldest extent is also preferably updated to indicate a new valid count, LBA, size and pointer fields for the fraction of the oldest extent that remains in the cache memory. Specifically, the valid count and size are preferably decremented, and the LBA and pointer are incremented for each logical block that is re-allocated in the oldest extent.

In another preferred aspect, the extent records indicate the temporal order of their associated extents. This avoids problems with data coherency when multiple extents possess data that maps to identical logical block addresses. This preferred aspect provides efficient write data caching and command queuing when a host device issues multiple write commands to the same LBA in a short period of time.

In another preferred aspect, the Dirty Count value is incremented after each logical block is written to the cache memory from the host device. The Dirty Count value is then decremented after each logical block placed in the cache memory by the write command is written from the cache memory to the higher latency storage device. Likewise, the Hit Count is preferably set to the number of logical blocks in the cache memory by a read request from the host device. After each logical block is read from cache memory to the host device, the Hit Count value is decremented. The Dirty Count and Hit Count values indicate how many logical blocks are involved in pending data transfers. In this preferred aspect, these logical blocks are prevented from being re-allocated during the transfer.

In another preferred aspect, the present invention further incorporates speculative read data into the cache memory. Speculative read data comprises logical blocks that a cache memory management algorithm predicts will soon be requested by a host device. Thus, when the host device issues the request, the data is already present in cache memory, reducing the time necessary to fulfill the request. The speculative read data preferably does not increment the value of a hit count or dirty count field, and thus can be re-allocated in the cache memory for blocks of required data.

An exemplary storage device of the present invention is illustrated and described in FIG. 3. The preferred storage device comprises a higher latency data storage component 309 such as a hard disk drive, a compact disc read only memory (CD-ROM) drive, or a magnetic tape drive. In the example of a hard disk drive a read channel integrated circuit (IC) 307 interfaces with the high latency storage device 309 to process and respond to read/write requests from control IC 301. Control IC 301, in turn, communicates through host interface 305 to receive and respond to read/write requests from an external host device 304, which may comprise a computer and include a central processing unit (CPU).

The storage device also includes a lower latency memory 303 that is in electronic communication with the higher latency data storage component through a control IC 301. The lower latency memory 303 preferably comprises random access memory (RAM), such as dynamic random access memory (DRAM) or static random access memory (SRAM). At least a portion of memory 303 is used to implement extented buffer memory in accordance with the present invention. The extent record set 102 (FIG. 2) is implemented in memory 303 or in storage structures within control IC 301 itself.

An example of the preferred storage device shown in FIG. 3 is an "intelligent" hard disk drive. This disk drive includes a buffer memory that includes cache memory, implemented in RAM to buffer data being transferred between the disk media and the host system. The buffer memory reduces latency as well as adapts the disparate data rates between the data bus communicating with the host system and the read/write channel circuitry that communicates with the disk media. The disk drive communicates with the host 304 via the host interface. Example host interfaces include small computer system interface (SCSI) and integrated drive electronics (IDE) interface (which is also referred to as an advanced technology attachment or "ATA" interface).

Control IC 301 comprises a microcontroller or microprocessor implemented as a stand-alone component or embedded device. Control IC 301 may be implemented as a integrated circuit (IC) or application specific integrated circuit (ASIC) device having on-board memory, signal conditioning components, peripherals and the like to provide desired system functionality. Control IC 301 includes sufficient data processing capacity to execute programmed instructions to initialize and manage cache memory 100. Control IC 301 is preferably integrated into the storage device of the present invention.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for caching data in a memory comprising the steps of:

providing a host device generating read/write access requests;

providing a memory in communication with the host device, the memory comprising one or more extents;

providing a cacheable storage device in communication with the memory;

creating an extent record associated with each extent;

receiving a storage device access request from the host device; and changing at least one state field value in the extent record in response to the access request.

2. The method of claim 1, further comprising the step of allocating an extent within the memory and associated with the extent record, wherein a size of the extent is allocated based on the access request and any additional speculative read size.

3. The method of claim 1, wherein said at least one state field value is selected from the group consisting of: extent size, valid count, hit count, and dirty count.

4. The method of claim 1, further comprising the steps of:

searching for a targeted logical block in the memory by searching the extent record; and locating the targeted logical block in the memory through a pointer value in the extent record.

5. A method for caching data in a memory comprising:

providing a storage device and a host device in communication with the memory;

creating an extent record associated with the memory;

receiving a storage device access request from the host device; and changing at least one state field value in the extent record in response to the access request, wherein the step of changing the at least one state field value in the extent record in response to the access request comprises:

incrementing a hit count each time a target logical block is identified in the memory; and decrementing the hit count after each target logical block is read from the memory to the host device, wherein the target logical blocks are not re-allocated in the memory until the hit count is fully decremented.

6. A method for caching data in a memory comprising:

providing a storage device and a host device in communication with the memory;

creating an extent record associated with the memory;

receiving a storage device access request from the host device; and changing at least one state field value in the extent record in response to the access request, wherein the step of changing the at least one state field value in the extent record in response to the access request comprises:

incrementing a dirty count after a logical block is written from the host device to the memory; and decrementing the dirty count after the logical block is written from the memory to the storage device, wherein the logical block is not re-allocated in the memory until the dirty count is fully decremented.

7. An extent record-managed cache memory comprising:

a memory comprising one or more extents, wherein the memory is in communication with a storage device and a host device; and an extent record associated with each extent and having at least one state field value, wherein the at least one state field value changes in response to a read/write access request.

8. The extent record-managed cache memory of claim 7, further comprising an extent within the memory and associated with the extent record, wherein a size of the extent is allocated based on the access request and any additional speculative read size.

9. The extent record-managed cache memory of claim 7, wherein said at least one state field value is selected from the group consisting of: extent size, valid count, hit count, and dirty count.

10. The extent record-managed cache memory of claim 7, wherein the extent record managed cache memory comprises a plurality of extent records whose total number is set by the access request.

11. A storage device comprising:

a higher latency data storage component;

a lower latency memory in communication with the higher latency data storage component and a host device, wherein the lower latency memory comprises one or more extents;

an extent record associated with each extent and having at least one state field value in the extent record, wherein the at least one state field value changes in response to a read/write access request.

12. The storage device of claim 11, wherein said higher latency data storage component comprises a hard drive.

13. The memory device of claim 12, wherein said storage device is an intelligent hard disk drive.

14. A data storage system comprising:

a higher latency data storage component;

a host device:

a lower latency memory in communication with the higher latency data storage component and the host device, wherein the lower latency memory comprises one or more extents;

an extent record associated with each extent and having at least one state field value in the extent record, wherein the at least one state field value changes in response to a read/write access request.

15. The data storage system of claim 14, further comprising an extent within the memory and associated with the extent record, wherein a size of the extent is allocated based on the access request and any additional speculative read size.

16. The data storage system of claim 14, wherein said at least one state field value is selected from the group consisting of: extent size, valid count, hit count, and dirty count.

17. The data storage system of claim 14, wherein the data storage system comprises a plurality of extent records whose total number is set by the access request.

18. The data storage system of claim 14, wherein the higher latency data storage component comprises a hard disk.

19. The data storage system of claim 14, wherein the lower latency memory comprises Random Access Memory (RAM).

20. The data storage system of claim 14, further comprising a communication means selected from the group consisting of Advanced Technology Attachment (ATA) and Small Computer Systems Interface (SCSI) communication means wherein said lower latency memory and the higher latency data storage component communicate with the host device through said communication means.

21. The data storage system of claim 14, wherein said host device includes a central processing unit (CPU).

22. The data storage system of claim 21 wherein said host device comprises a computer.

* * * * *